United States Patent [19]
Hayashi et al.

[11] 3,957,363
[45] May 18, 1976

[54] MOTION PICTURE CAMERA WITH SYNCHRONOUS RECORDING SYSTEM

[75] Inventors: Yoshihisa Hayashi, Tondabayalshi; Yukio Miki, Saki, Japan

[73] Assignee: Minolta Camera Kabushiki Kaisha, Japan

[22] Filed: Oct. 24, 1974

[21] Appl. No.: 517,832

[30] Foreign Application Priority Data
Oct. 24, 1973 Japan............... 48-122655[U]
Nov. 24, 1973 Japan............... 48-131204
Nov. 24, 1973 Japan............... 48-134655[U]

[52] U.S. Cl................ 352/72; 352/27
[51] Int. Cl.²............... 352 29; G03B 23/02
[58] Field of Search............... 352/27, 29, 72

[56] References Cited
UNITED STATES PATENTS

| | | | |
|---|---|---|---|
| 3,025,750 | 3/1962 | Polan | 352/72 |
| 3,464,765 | 9/1969 | Broeckl | 352/72 |
| 3,825,327 | 7/1974 | Kosarko | 352/72 |
| 3,880,504 | 4/1975 | Marvin | 352/72 |

OTHER PUBLICATIONS
Defensive Publication No. T920,009, Pub. 3/5/74, Filed 4-30-73, Kosarko 352-372.

*Primary Examiner*—Monroe H. Hayes
*Attorney, Agent, or Firm*—Watson, Cole, Grindle & Watson

[57] ABSTRACT

A motion picture camera provided with a synchronous recording system which is adapted for use with either a sound film cassette or a silent film cassette, the sizes of the both cassettes being different. The motion picture camera is provided with a control mechanism operable according to the type of film cassette loaded within the camera. This control mechanism is adapted to set the camera so as to carry out a normal photographing operation, when a sound film cassette is loaded in the camera, and to set the camera so as to carry out a silent photographing operation, when a silent film cassette is loaded.

7 Claims, 19 Drawing Figures

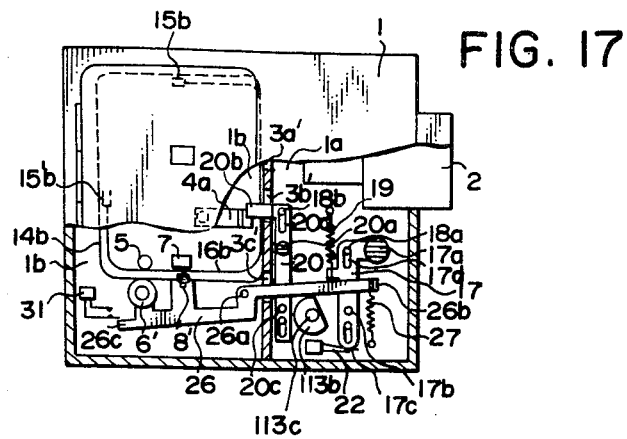
FIG. 17
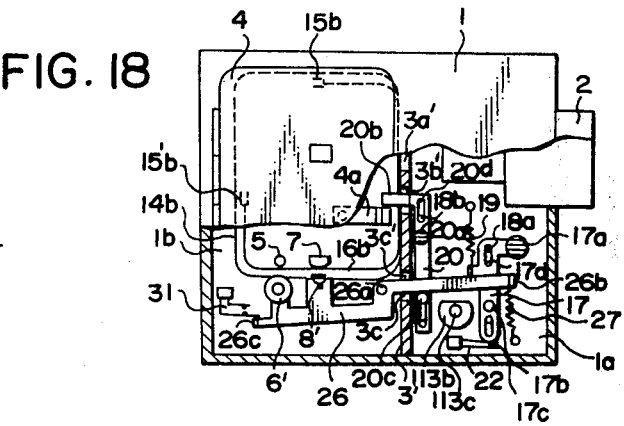
FIG. 18
FIG. 19
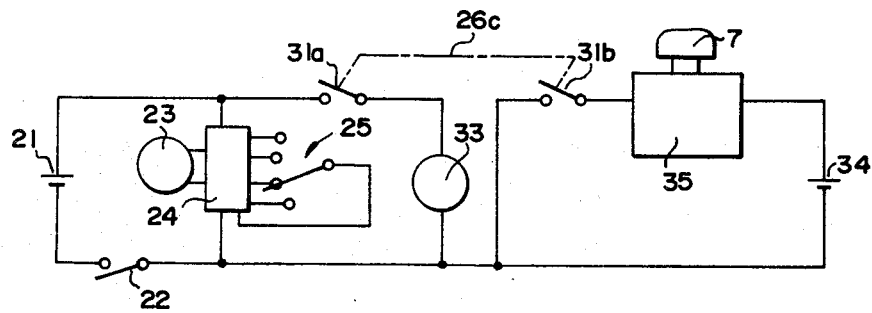

MOTION PICTURE CAMERA WITH SYNCHRONOUS RECORDING SYSTEM

BACKGROUND OF THE INVENTION

This invention relates to a motion picture camera using a film cassette and having a synchronous recording system which permits synchronous sound recording.

As is well known, there are two types of film cassettes, i.e., the cassette for a sound film and a cassette for a silent film. The former differs from the latter in its size such that the height of the former is 15 mm greater than that of the latter.

It is also well known that the film speed of the sound films can be either 18 frames per second or 24 frames per second. Thus, if sound cassettes are used at a film feed speed other than 18 or 24 frames per second, variations in the sound generating frequency result, thereby failing to achieve the intended normal regeneration of sound in synchronism with the motion picture.

On the other hand, however, while the normal film feed speed for a silent film is set to 18 frames per second, it sometimes happens that a different film feed speed is required. Consequently, a camera of this type is designed so as to permit switching of the film feed speeds, for instance from 18 frames per second to 54 frames per second or 12 frames per second.

This is also the case with such a motion picture camera having a synchronous sound recording system and using a film cassette as described. In other words, the camera may be loaded with either a silent film cassette or a sound film cassette, thus permitting either silent film photographing or sound film photographing coupled with synchronous sound recording. When a sound film cassette is loaded in a camera but the film feed speed is set to a film feed speed other than 18 or 24 frames per second, i.e., to 54 frames per second or 12 frames per second, however, then the camera fails to record the sound in proper synchronization with the photographing, thereby wasting the costly sound film.

SUMMARY OF THE INVENTION

An object of the present invention is to provide a motion picture camera which is provided with a synchronous sound recording system and permits the utilization of either a silent film cassette or a sound film cassette.

Another object of the present invention is to provide the motion picture camera with a switching member which may be automatically switched commensurate with the type of film cassette so as to enable the camera to accommodate respective types of films.

A further object of the present invention is to provide a motion picture camera which is provided with a synchronous sound recording system and permits the utilization of either a silent film cassette or a sound film cassette as well as manual setting of a film feed speed to anyone of at least three different speeds, with the camera being provided with a switching member which detects when a sound film cassette has been loaded and automatically switches so as to only permit the setting of the film feed speed to no more than two different speeds both of which are suitable for the sound film feed.

In order to accomplish these objectives, a motion picture camera is provided which is capable of selectively utilizing both sound film cassettes and silent film cassettes, both of which have different sizes. This camera is also provided with a synchronous sound recording system for utilization in conjunction with the sound film cassette. The cassette chamber within the camera can be loaded with either a sound film cassette or a silent film cassette. A sensing member is provided within the camera for sensing the size of the film cassette which has been loaded within the camera, which in turn provides an indication as to the type of cassette selected. A control mechanism sets the camera to provide synchronous sound recording with normal photographing when a sound film cassette is loaded within the camera and alternatively to provide photographing of a silent film when a silent film cassette is loaded within the cassette chamber.

In one embodiment of the present invention, the motion picture camera is provided with a recording head adapted to record sound on a sound film, a capstan adapted to drive the sound film at a constant speed, a pressing pad adapted to press the sound film against the recording head and a pinch roller adapted to press the sound film against the capstan. These members are arranged within the camera in such a manner as to permit the loading of either a silent film cassette or a sound film cassette within the cassette chamber. When the control mechanism, which includes a switching member, detects a sound film cassette being charged, the pressing pad and the pinch roller are brought to their pressing positions against the recording head and the capstan, respectively.

In a modified embodiment of the present invention, the motion picture camera, which can be selectively loaded with either a sound film cassette or a silent film cassette, is provided with a pressing pad adapted to press a sound film against a recording head in a synchronous recording system, and a pinch roller adapted to press the sound film against a capstan. The camera has a cassette chamber which can be loaded with the selected film cassette and a cover member which is movable between open and closed positions and covers the chamber. When the cover member over the cassette chamber is in its open position for exchanging a cassette, even if a sound film cassette has been loaded in the cassette chamber, a release member for controlling the release of the pressing pad and pinch roller is restricted from operating thereby preventing the sound film from being pressed against the sound recording head and the capstan.

In another embodiment of the present invention, the motion picture camera is provided with a first drive mechanism adapted to intermittently feed a film by selectively setting a desired film feed speed among a plurality of film feed speeds for photographing and a second drive mechanism adapted to continuously feed a sound film to a recording head at a specified film feed speed with the utilization of a capstan. As before, the camera can be selectively loaded with either a sound film cassette or a silent film cssette and is provided with a switching member which is capable of detecting when the film feed speed selected to be set in the first drive mechanism is not in accord with the specified in the second drive mechanism. When such a condition is detected, the synchronous sound recording system is brought into a rest position. When the film feed speeds of the first and second drive mechanisms are in accord with each other however, the switching member brings the synchronous sound recording system into an operating condition.

In a modification of this last embodiment, the motion picture camera is provided with a cover member over its film cassette chamber, in which a film cassette is loaded. When the cover member is in its open position, even if the film feed speeds in the first and second drive mechanisms are in accord with each other, the synchronous sound recording system is still maintained in its rest condition.

BRIEF DESCRIPTION OF THE DRAWINGS

FIGS. 6 through 9 are partially sectional side elevational views of a second embodiment of the present invention, in which: FIG. 6 shows a sound film cassette loaded within the camera, with a cover member of a cassette chamber being in its open condition, thus representing a non-releasing condition; FIG. 7 shows the camera when the cover member is in its locked condition, representing a condition prior to the releasing operation; FIG. 8 shows the camera after the releasing operation; and, FIG. 9 shows a silent film cassette loaded within the camera.

FIGS. 15 through 18 are partially sectional side elevational views of the embodiment of FIG. 14, in which: FIG. 15 shows a sound film cassette loaded within the camera, with the cover member of the cassette chamber locked and with the film drive speed in accord with the film feed speed, presenting a nonreleasing condition; FIG. 16 shows the camera after the releasing operation under the condition of FIG. 15; FIG. 17 shows the condition where a sound film cassette is loaded, the cover member is closed and a releasing operation is under way but where the intermittent film feed speed is set to a film feed speed different from that of the sound film; and, FIG. 18 shows the camera when the cover is released from the locked condition; and FIG. 19 is a schematic diagram of the circuitry for utilization with the third embodiment illustrated in FIGS. 14 through 18.

DESCRIPTION OF THE PREFERRED EMBODIMENTS

Figure 1:
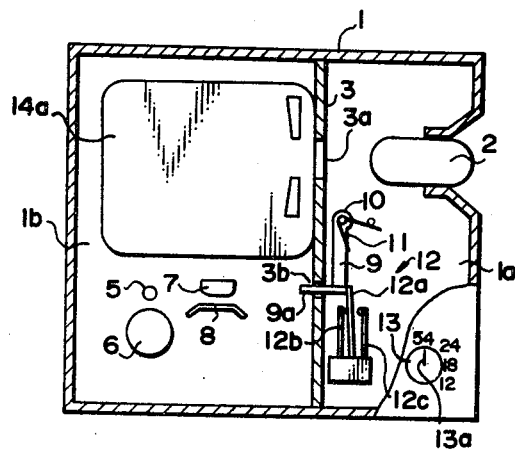
FIGS. 1 and 2 are partially sectional side elevational views showing one embodiment of a motion picture camera according to the present invention, with a silent film cassette being loaded in the camera in FIG. 1 and a sound film cassette being loaded in the camera in FIG. 2.
Figure 2:
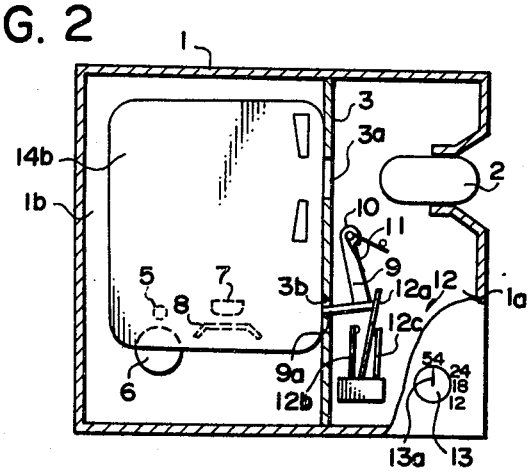

As shown in FIGS. 1 and 2, a camera body 1 includes a film cassette chamber 1b and a front chamber 1a, which are partitioned by a partition wall 3. Partition wall 3 has an opening 3a facing a photographing lens and hole 3b, through which a sensitive member, which will be later described, may extend.

A film cassette is loaded within cassette chamber 1b. The cassette utilized can be either a silent film cassette 14a as shown in FIG. 1 or a sound film cassette 14b as shown in FIG. 2, the heights of such cassettes being different from each other with the latter being about 15 mm greater than the former.

A capstan 5, which is adapted to sound film recording, a sound recording head 7, and a pressing pad 8 are provided within film cassette chamber 1b. The members are arranged within chamber 1b such that when silent film cassette 14a is loaded they are positioned outside of the cassette, as shown in FIG. 1, but when sound film cassette 14b is loaded, they are positioned within the cassette. A pinch roller 6 is also provided and is arranged so as to be partly positioned within the cassette. Hole 3b defined in partition wall 3 is designed as to be opened, when silent film cassette 14a is loaded, but closed by the front surface of sound film cassette 14b, when loaded.

A projection 9a of a sensitive lever 9 is rotatably journaled in camera body 1 by means of a shaft 10 arranged in front chamber 1a in front of partition wall 3. Lever 9 is biased by a spring 11 so as to rotate in the clockwise direction. Projection 9a faces hole 3b and tends to extend through hole 3b due to the bias on sensitive lever 9, thereby projecting into cassette chamber 1b.

A change-over switch 12 includes a movable piece 12a having a tendency to contact sensitive lever 9 due to its flexibility. Switch 12 also includes a contact piece 12b, which movable piece 12a contacts when projection 9a projects into cassette chamber 1b, and a contact piece 12c, which movable piece 12a contacts when projection 9a is pushed out of cassette chamber 1b.

A film feed speed setting dial 13, which rotatably projects out of the camera body, may be manually set to any one of three or more different film feed speeds. For instance, an index 13a of a dial may be set to graduations 12, 18, 24 and 54, thereby presenting various film feed speeds, such as 12, 18, 24 and 54 frames per second, respectively.

Figure 3:
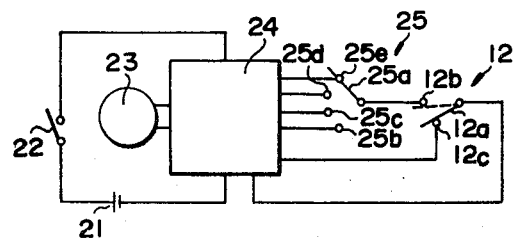
FIGS. 3 through 5 show schematic diagrams of three embodiments of a drive circuit for the motion picture camera such as shown in FIGS. 1 and 2.

FIG. 3 shows one embodiment of a drive motor circuit according to the present invention. A drive motor 23 and a governor 24 for the motor are connected to one end of an electric power source cell 21 by way of a release switch 22 while the other pole of governor 24 is connected to the other end of cell 21. The speed of drive motor 23 is driven and controlled by means of governor 24.

Incorporated in governor 24 is a circuit for rotating drive motor 23 commensurate with the respective film feed speeds such as 12, 18, 24 and 54 frames per second, in which terminals corresponding to respective film feed speeds are connected to terminals 25b, 25c, 25d and 25e of a film speed setting switch 25 which is coupled to dial 13. A circuit for imparting the rotation of a sound film feed speed to drive motor 23 is also incorporated in governor 24, the terminal thereof being connected to a contact piece 12c of change-over switch 12. As the circuitry of governor 24 for controlling speed of the drive motor is well known, it will be needless to explain or illustrate thereabout.

A movable piece 25a of film speed setting switch 25 which cooperates with film feed setting dial 13 is selectively connected to one of terminals 25b, 25c, 25d and 25e, and the other end of piece 25a is connected to contact piece 12b of change-over switch 12. Movable piece 12a of change-over switch 12 has one end connected to either contact piece 12b or contact piece 12c, while its other end is connected to governor 24. With such an arrangement, when silent film cassette 14a is loaded in cassette chamber 1b as shown in FIG. 1, hole 3b in partition wall 3 is not covered with the front surface of cassette 14a, so that projection 9a on sensitive lever 9 projects into cassette chamber 1b. Under such a condition, movable contact piece 12a of change-over switch 12 is connected to contact piece 12b, whereupon movable piece 25a of the filmm speed setting switch 25 is connected to one of terminals 25b through 25e commensurate with the film feed speed set by film speed setting dial 13, thereby effecting photographing at the selected film feed speed.

Alternatively, when sound film cassette 14b is charged in a camera, as shown in FIG. 2, projection 9a is pushed out of cassette chamber 1b by means of the front surface of cassette 14b, so that sensitive lever 9 rotates in the counterclockwise direction. Rotation of lever 9 causes movable contact piece 12a of change-over switch 12 to be disconnected from contact piece 12b and in turn connected to contact piece 12c. Accordingly, irrespective of the film feed speed set by film speed setting dial 13, motor 23 is driven at a sound film feed which is specified by governor 24.

Figure 4:
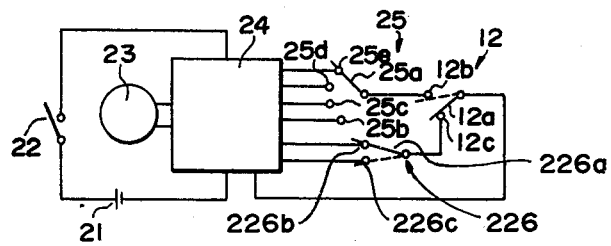

FIG. 4 shows a second embodiment, in which the circuit is adapted to change the film feed speed to a specified speed of 18 frames per second or 24 frames per second when a sound film cassette is utilized. In this embodiment, contact piece 12c is connected to a movable piece 226a of a change-over switch 226, while terminals 226b and 226c for switching movable piece 226a are connected to terminals of governor 24 for the motor, which sets the film feed speed at either 18 or 24 frames per second, depending upon the terminal selected.

Alternatively, the film feed speeds attained through the connection of morable contact 25a with terminal 25c may be equal to that attained when movable piece 12a is connected to terminal 226b, through movable price 26a, and the film feed speed attained through the connection of movable price 25a with terminal 25d can be equal to that attained when movable piece 12a is connected to terminal 226c, through movable price 26a.

Figure 5:
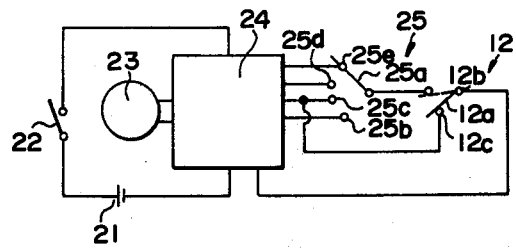

FIG. 5 shows the third embodiment, in which the circuit in governor 24 for separately controlling the sound film feed speed is eliminated. Instead, a circuit for use in rotating the motor at an R.P.M. level commensurate with the respective film feed speeds is incorporated in governor 24 which circuit is used in common with the circuit previously referred to, so that even when film feed speed setting dial 13 sets a film feed speed other than the specified film feed speed (18 frames per second is shown in the drawing), motor 23 will be driven at the speed to provide the specified film feed speed so long as movable contact 12a is connected to terminal 12c by the sound film casette 14b.

As shown in FIG. 5, one terminal of motor 23 and governor 24 for the motor is connected by way of a release switch 22 to one pole of electric power source 21, while the other terminal is connected to the other pole of electric power source 21. Provided for governor 24 are terminals corresponding to the respective film feed speeds of 12, 18, 24 and 54 frames per second, which terminals are connected to terminals 25b, 25c, 25d and 25e, respectively, of film feed speed setting switch 25. One end of contact piece 25a is connected to one of these terminals (in the drawing, the terminal for 54 frames per second), while its other end is connected to contact piece 12b of changeover switch 12. Contact piece 12c is connected to terminal 25c (18 frames per second) of film feed speed setting switch 25. One end of movable piece 12a of change-over switch 12 is connected to either contact piece 12b or 12c (in the drawing, contact piece 12c), while its other end is connected to governor 24.

In accordance with a second embodiment of the present invention, a switching member is provided which is adapted to effect pressing and releasing operations for the capstan and the sound recording head against the pinch roller and the pressing pad in the sound recording system, as shown in FIGS. 6 through 9. In a manner similar to the first embodiment, partition wall 3 is provided with opening 3a' and two slots 3b' and 3c'. Partition wall 3' separates front chamber 1a from cassette chamber 1b, and opening 3a' and slots 3b' and 3c' extend along the length of wall 3'.

Formed on one side wall of the cassette chamber 1b is a cover member 4 which is rotatably journaled at its rear end and thus may be opened or closed. Thus, upon opening cover member 4, the replacement of film cassettes 14a and 14b may be effected.

A release lever 17 may be moved up and down, with a set of guide pins 18a being fitted in corresponding slots 17d within front chamber 1a. A release button 17a secured to the release lever 17, which is upwardly biased by means of spring 19, projects outwardly of a hole 18 defined in the side wall of front chamber 1a. An operating pin 17b is mounted on release lever 17 and projects outwardly therefrom. Immediately under lower end 17c of release lever 17 is a motor driving electric power source switch 22, such as described above in conjunction with motor 23 and governor 24. The switch 22 has a tendency to be normally opened but is adapted to be closed when release lever 17 is lowered against the action of spring 19.

A lock lever 20 is slidingly movable up and down, with slots 20d receiving corresponding guide pins 18b in front chamber 1a therein. Lock lever 20 is provided with an operating button 20a, a locking pawl 20b piercing through slot 3b' in partition wall 3' and projecting into cassette chamber 1b, and an operating pin 20c. In its upper position locking pawl 20b is disengaged from locking piece 4a formed on the inner surface of cover member 4 to thereby release cover member 4 from engagement, while in its lower position locking pawl 20b engages locking piece 4a to lock cover 4.

Figure 6:
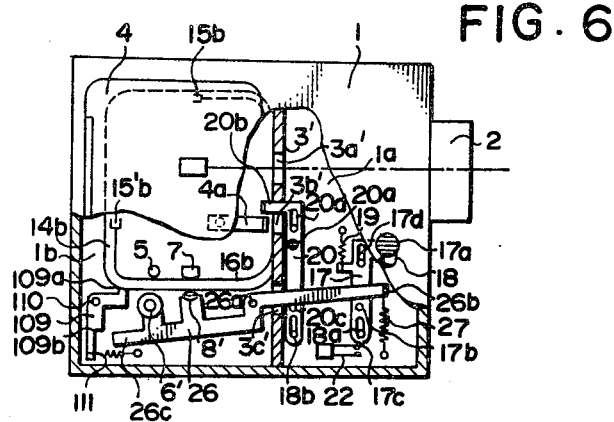
Figure 9:
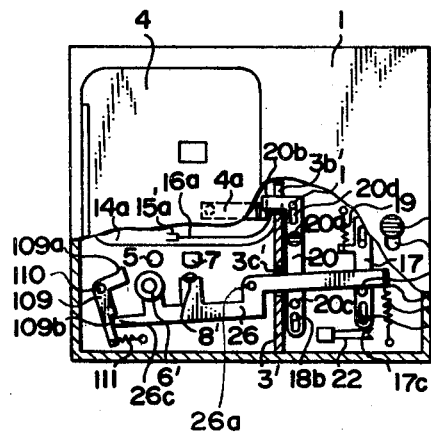

FIG. 6 shows sound film cassette 14b loaded in cassette chamber 1b, while FIG. 9 shows silent film cassette 14a loaded in cassette chamber 1b. Referring to FIG. 9, film 16a which has come out through a film exit (not shown) of the silent film cassette is reintroduced through an entrance 15a' back into the cassette, immediately after passing through exposure window portion 3a'. In the case of using sound film cassette 14b, which is greater in its height than that of the silent film cassette, sound film 16b from exit 15b passes through an exposure window 3a' and then through sound recording head 7 and capstan 5 in cassette chamber 1b and back through an entrance 15b' into cassette 14b, as shown in FIG. 6.

A detecting projection 109a on a sensitive lever 109 is rotatably journaled on a shaft 110 in cassette chamber 1b and is biased in a counterclockwise direction by a spring 111. Detecting projection 109a engages the lower edge of sound film cassette 14b so as to be rotated in the clockwise direction against the action of spring 111, when sound film cassette 14b is loaded in cassette chamber 1b, as shown in FIG. 6.

A switching lever 26, which has a tail portion 26c engageable with a shoulder portion 109b formed on sensitive lever 109, is rotatably journaled on a shaft 26a, while the tip portion thereof extends through a hole 3c' into front chamber 1a. Switching lever 26 is biased in a clockwise direction by a spring 27 connected to tip portion 26b of lever 26. Switching lever 26 is provided with a pressing pad 8' adapted to abut sound recording head 7 and a pinch roller 6' adapted to abut a capstan 5, when lever 26 is rotated in the clockwise direction by means of spring 27. Pinch roller 6' is rotatably journaled on lever 26. Operating pin 17b on release lever 17 is engageable with switching lever 26, when operating pin 17b is in its upper position which permits switch 22 to open. When operating pin 17b in its lower position and is thus disengaged from switching lever 26, switch 22 is closed. In addition, in the upper position of lock lever 20 where locking pawl 20b of lock lever 20 is disengaged from locking piece 4a, operating pin 20c engages switching lever 26 so as to rotate lever 26 in the counterclockwise direction against the action of spring 27, while in the lower position of lock lever 20, operating pin 20c is disengaged from switching lever 26.

Accordingly, as shown in FIG. 9, when silent film cassette 14a is loaded in the camera instead of a sound film cassette, sensitive lever 109 rotates in the counterclockwise direction under the action of spring 111 so that shoulder portion 109b thereof becomes engageable with tail portion 26c of switching lever 26. Thus, even if switching lever 26 tends to rotate in the clockwise direction by means of spring 27, lever 26 is locked by means of shoulder portion 109b, so that pinch roller 6' is maintained in the retracted position from capstan 5 and pressing pad 8' in the retracted position from sound recording head 7.

On the other hand, when the lock lever 20 is moved upwardly, cover member 4 is opened to allow the loading of a cassette. When sound film cassette 14b is loaded in a camera, the sensitive lever 109 rotates in the clockwise direction due to the lower wall of cassette 14b, as shown in FIG. 6, while shoulder portion 109b is disengaged from switching lever 26. However, the clockwise rotation of sensitive lever 26 due to spring 27 is interrupted by means of operating pin 20c, so that the pinch roller 6' is still maintained in its retracted position from capstan 5 and pressing pad 8' is still maintained in the retracted position from sound recording head 7, thereby facilitating the threading of sound film 16b.

Figure 7:
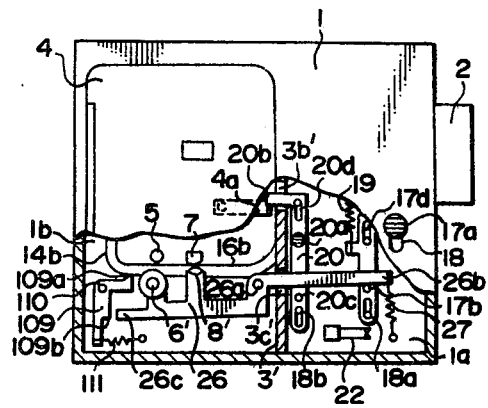
Figure 8:
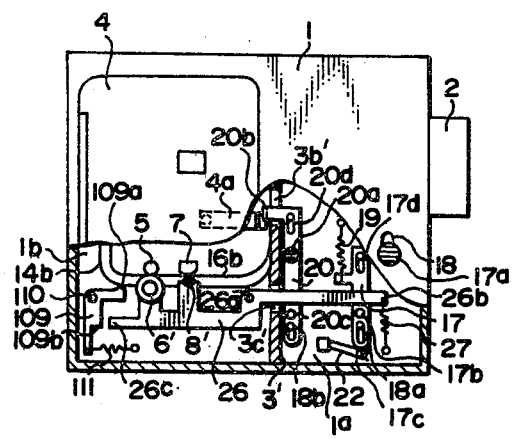

When lock lever 20 is shifted downwards by means of its operating button 20a as shown in FIG. 7, switching lever 26 is then released from the locked condition due to the operating pin 20c and thus rotates in the clockwise direction by means of spring 27. This rotation, however, is interrupted by operating pin 17b, immediately before pinch roller 6' and pressing pad 8' both contact capstan 5 and sound recording head 7, respectively.

Under these conditions, if release button 17a is pressed downwards thereby lowering pin 17b and releasing switching lever 26, then pinch roller 6' presses film 16b against capstan 5 and pressing pad 8' presses film 16b against sound recording head 7, respectively. The lower end 17c of lever 17 now closes switch 22, thus activating the motor drive circuit. Sound is now recorded on film 16b by sound recording head 7, simultaneously with the constant speed travel of the film due to capstan 5.

Figure 10:
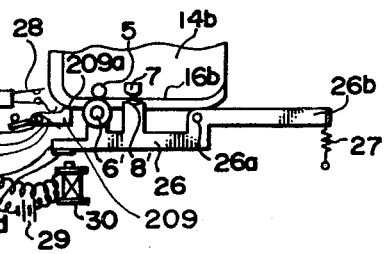
FIGS. 10 and 11 show a partial view of a first modification of the second embodiment of the camera, as shown in FIGS. 6 through 9, in which the camera is loaded with a sound film cassette in FIG. 10 and a silent film cassette in FIG. 11.
Figure 11:
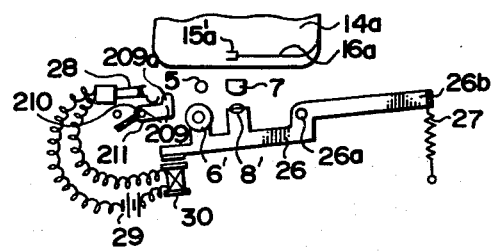

FIGS. 10 and 11 show the first modification of the second embodiment, wherein a sensitive lever 209 detects whether a sound film cartridge 14b is loaded. Lever 209 is rotatable about shaft 210, which is connected to end 211 of lever 209. End 209a of lever 209 will be pressed down when sound film cartridge 14b is loaded, thereby causing lever 209 to rotate in a clockwise direction. Alternatively, use of a silent film cartridge will enable lever 209 to rotate in the counterclockwise direction, in which lever 209 acts so as to close a control switch 28. Switch 28, in turn, causes electric power source 29 to energize an electromagnet 30 which attracts an armature 26d mounted on end 26c of switching lever 26. Thus, lever 26 is rotated against the action of spring 27, thereby releasing pinch roller 6' and pressing pad 8' from being pressed against capstan 5 and sound recording head 7, respectively.

Figures 12, 13:
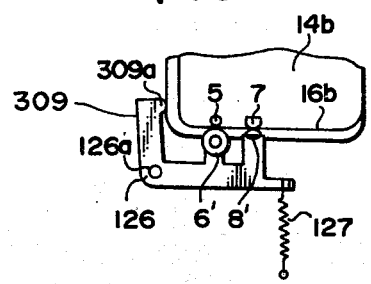
FIGS. 12 and 13 show a partial view of a second modification of the second embodiment of the camera, as shown in FIGS. 6 through 9, in which the camera is loaded with a sound film cassette in FIG. 12 and a silent film cassette in FIG. 13.

FIGS. 12 and 13 show another modification of the second embodiment of the invention, wherein a sensitive lever 309 is integrally constructed with a switching lever 126 (levers 309 and 126 effectively corresponding to levers 109 and 26). A detecting projection 309a is provided on sensitive lever 309 which along with lever 126 is journaled on a shaft 126a and is biased in the clockwise direction by means of spring 127. Thus, when sound film cassette 14b is loaded in the camera, sound film 16b is pressed against capstan 5 and sound recording head 7, respectively, and alternatively when silent film cassette 14a is loaded, the aforesaid press-contacting relation is released.

FIGS. 14 through 18 show a third embodiment of the invention, wherein the movement of switching lever 26 is controlled by a manual film feed speed setting dial 113. Switching lever 26 controls a second drive motor for driving the capstan as well as the sound recording device for their interrupted and continued operations for the purpose of simultaneous sound recording. In contrast, in the second embodiment of the invention as shown in FIGS. 6 through 9, the movement of switching lever 26 having pressing pad 8' and pinch roller 6' is controlled by means of sensitive lever 109, lock lever 20 and release lever 17, so as to, in turn, control the press-contacting operation and releasing operations for pressing pad 8' against sound recording head 7, and pinch roller 6' against capstan 5.

Figure 14:
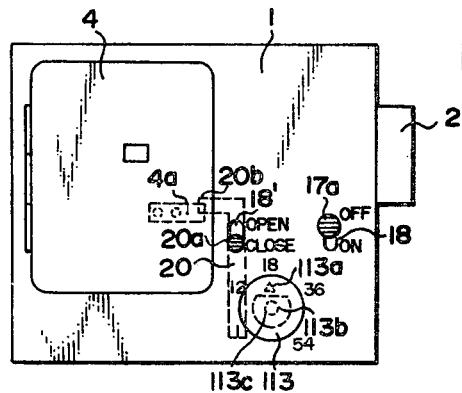
FIG. 14 is a side elevational view of a third embodiment of a motion picture camera according to the present invention.
Figure 15:
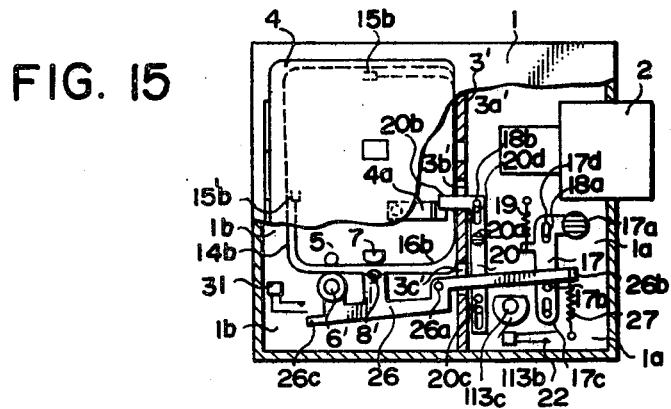

Manual film speed setting dial 113 is positioned on the outer side wall of the camera and is rotatably journaled on a shaft 113c. An index 113a of dial 113 may be set to a graduation 1 representing photographing at a speed of one frame per second, a graduation 12 representing 12 frames per second, or graduations 18, 36, 54 representing 18, 36, 54 frames per second, respectively. As shown in FIGS. 14 and 15, shaft 113c pierces through the side wall into front chamber 1a, with a cam 113b rigidly mounted on the tip of the shaft.

Cam 113b is completely retracted from switching lever 26, when film feed speed setting dial 113 is set to a film feed speed, for instance, of 18 frames per second (or 24 frames per second), which is suited for sound-recording on sound film 16b. In such a position, cam 113b permits the release of switching lever 26 due to movements of lock lever 20 and release lever 17, so that pressing pad 8' is pressed against sound recording head 7 and pinch roller 6' against capstan 5, respectively, while permitting switch 31 which is normally open, to be closed.

When film feed speed setting dial 113, however, is set to a wrong film feed speed, which is not suited for sound-recording on sound film 16b, then cam 113b engages switching lever 26 so as to interrupt the press-contact of pressing pad 8', and pinch roller 6' against sound recording head 7 and capstan 5, respectively. In this position switch member 31 is maintained in its open condition.

FIG. 19 shows a circuit diagram for the third embodiment, wherein film feed speed setting switch 25 (FIG. 3) and governor 24 for first drive motor 23 for use in intermittently driving film 16b for exposure are connected in series with electric power source 21. Switch 22 is again adapted to be closed by means of release lever 17. A first switch 31a is actuated by switch member 31 and enables the actuation of a second drive motor 33 for driving capstan 5 which rotates at a constant speed for controlling the sound recording on film 16b. Switch 31 and second drive motor 33 are connected in parallel with motor 23 and governor 24. Film feed speed setting dial 113, is connected to governor 24 in a manner such as shown in FIGS. 3 through 5. In addition, a second switch 31b which is also actuated by switch member 31, is connected to another electric power source 34. A sound recording device 35, which actuates sound recording head 7, is also connected to power source 34. It is to be noted that practically, the circuit of the sound recording device may be provide with a power switch (not shown) which is closed in relation with the closure of switch 22.

Accordingly, the first drive motor 23 is continuously fed electric power upon closure of release switch 22. Sound recording device 35 and second drive motor 33 however, are only brought into operating condition when switch member 31 is in its closed condition, thereby actuating a synchronous sound recording system. When switch member 31 is in its open condition however, the synchronous sound recording system is maintained in a non-operating condition.

Figure 16:
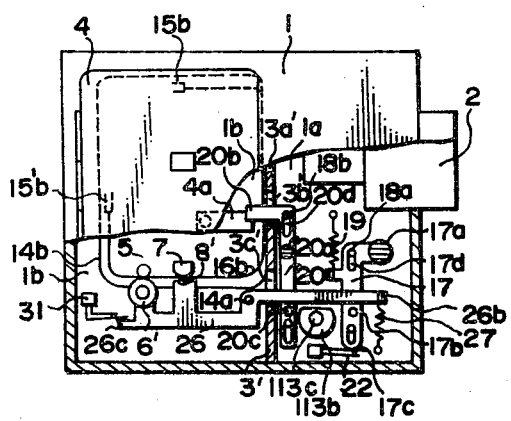

FIG. 15 shows a condition wherein a sound film cassette 14b is loaded, cover member 4 is locked, and manual film feed speed setting dial 113 is set to a film feed speed which is suited for sound recording on the sound film, but the releasing operation has not yet been effected and thus the synchronous sound recording system is maintained in a non-operating condition. Under such a condition, release lever 17 is moved downwards as shown in FIG. 16, then both switch 22 and switch 31 are closed and the synchronous sound recording system is actuated, thereby enabling simultaneous photographing and synchronous sound recording.

FIG. 17 shows the case were manual film feed speed setting dial 113 is set to a film feed speed which is not suited for sound recording on a sound film. In this condition, the clockwise rotation of switching lever 26 is interrupted by means of cam 113b and thus the synchronous sound recording system is maintained in the non-operating condition, even if the releasing operation has been effected. Consequently, exposure only can be effected at a set film feed speed.

FIG. 18 shows a case where, even if the manual film feed speed setting dial 113 is set to a film feed speed which is suited for a sound film, when cover member 4 is released from the locked condition for exchanging film cassette 14b, then operating pin 20c on lock lever 20 locks the switch lever 26 against rotation in the clockwise direction. In this condition, even if release lever 17 is moved downwards, switch lever 26 is maintained in its position and thus the synchronous sound recording system remains in the non-operating condition.

As is apparent from the foregoing, in accordance with this embodiment, sound recording at a film feed speed which is not suited for recording on the sound film is interrupted since the synchronous sound recording system is maintained in its non-operating condition. Additionally, unwanted consumption of electricity from the electric power source is prevented and high speed photographing may be carried out on the specific part of the sound film.

While the desired embodiments represent the preferred forms of the present invention, it is to be understood that modifications will occur to those skilled in the art without departing from the spirit of the invention. The scope of the invention is therefore to be determined solely by the appended claims.

We claim:

1. A motion picture camera capable of selectively utilizing both sound film cassettes and silent film cassettes, each being of a different size than the other, and provided with a synchronous recording system, comprising:

a cassette chamber adapted to receive a selected cassette;

means for detecting the type of a cassette selected by sensing the size of a film cassette loaded within said cassette chamber;

a drive means for driving a film in such film cassette loaded within said cassette chamber for a photographing operation;

film feed speed setting means coupled to said drive means for setting one of at least two different film feed speeds for a film to be driven by said drive means; and, control means for setting said camera to one of the film feed speeds which may be selectively set by said film feed speed setting means when said sensing means detects a sound film cassette loaded within said camera, such film speed being suited for permitting normal photographing of a sound film in conjunction with synchronous sound recording.

2. A motion picture camera as defined in claim 1, wherein: said drive means includes, in a series connection, an electric power source, a release switch to be closed in association with a release operation and a drive circuit having a motor and a governor for said motor; and said film feed speed setting means includes a dial adapted to be manually set to a desired film feed speed, means for switching said drive circuit to a selected film feed speed commensurate with the setting of said dial; and said control means includes a change-over switch disconnecting said drive circuit from said film feed speed setting means, when said sensing means detects a sound film cassette loaded within said cassette chamber, and causing said drive circuit to be set to a film feed speed suited for effecting normal photographing of a sound film in conjunction with synchronous sound recording.

3. A motion picture camera as defined in claim 2, further comprises a further switch connected to said drive circuit by said change-over switch; wherein when said sensing means detects a sound film cassette loaded within said cassette chamber and said further switch is selectively switched for obtaining one of two film feed speeds suited for normal photographing in conjunction with synchronous sound recording on said sound film.

4. A motion picture camera capable of selectively utilizing both sound film cassettes and silent film cassettes, each being of a different size than the other, and provided with a synchronous recording system, comprising:
- a cassette chamber adapted to receive a selected cassette;
- a release member movable between a non-operating position and an operating position and biased so as to be positioned in said non-operating position;
- an electric power source;
- first drive means selectively coupled to said electric power source when said release member is in said operating position so as to be actuated for driving a film in a film cassette loaded in said cassette chamber, for exposing such film;
- film feed speed setting means selectively settable to a film feed speed among a plurality of film feed speeds and coupled to said first drive means for setting the speed thereof;
- a capstan rotatably mounted within said synchronous recording system in a given position relative to said camera and adapted for driving a sound film at a constant speed for sound recording, when a sound film cassette is loaded within said cassette chamber;
- a sound recording head;
- a switching member having a pinch roller rotatably mounted thereon and a pressing pad fixedly mounted thereon, said switching member being movable between a first position and a second position, in said first position said pinch roller pressing a sound film against said capstan and said pressing pad pressing such sound film against said recording head and in said second position such press-contacting relationships being released; and
- first locking means, associated with said film feed speed setting means, for locking said switching member in its second position when said film feed speed setting means sets a film feed speed different from a specified film feed speed suitable for effecting normal photographing of such sound film in synchronism with sound recording.

5. A motion picture camera as defined in claim 4, further comprising:
- second drive means;
- a first switch for respectively connecting and disconnecting said second drive motor to and from said electric power source;
- sound recording means coupled to said sound recording head;
- a further electric power source;
- a second switch for respectively connecting and disconnecting said sound recording means to and from said further electric power source for bringing said sound recording head into an operating condition;
- means for opening said first and second switches when said switching member is in said second position and closing said first and second switches when said switching member is in said first position.

6. A motion picture camera as defined in claim 4, further comprising:
- a cover member respectively movable between opened and closed positions for respectively inserting and removing a film cassette into and from said cassette chamber; and
- second locking means having a lock member movable between a first position to lock said cover member in its closed position and a second position to release such locking condition, said second locking means locking said switching member in said second position when said lock member is in its second position and releasing such locking condition when said lock member is in its first position.

7. A motion picture camera as defined in claim 4, further comprising:
- release means for locking said switching member in its second position until actuation of a release operation and releasing such locking condition in association with such release operation.

* * * * *